March 20, 1973   G. A. GOODING   3,721,762
ELECTRICAL RACEWAY AND DECORATIVE MOLDING
Filed Dec. 8, 1971
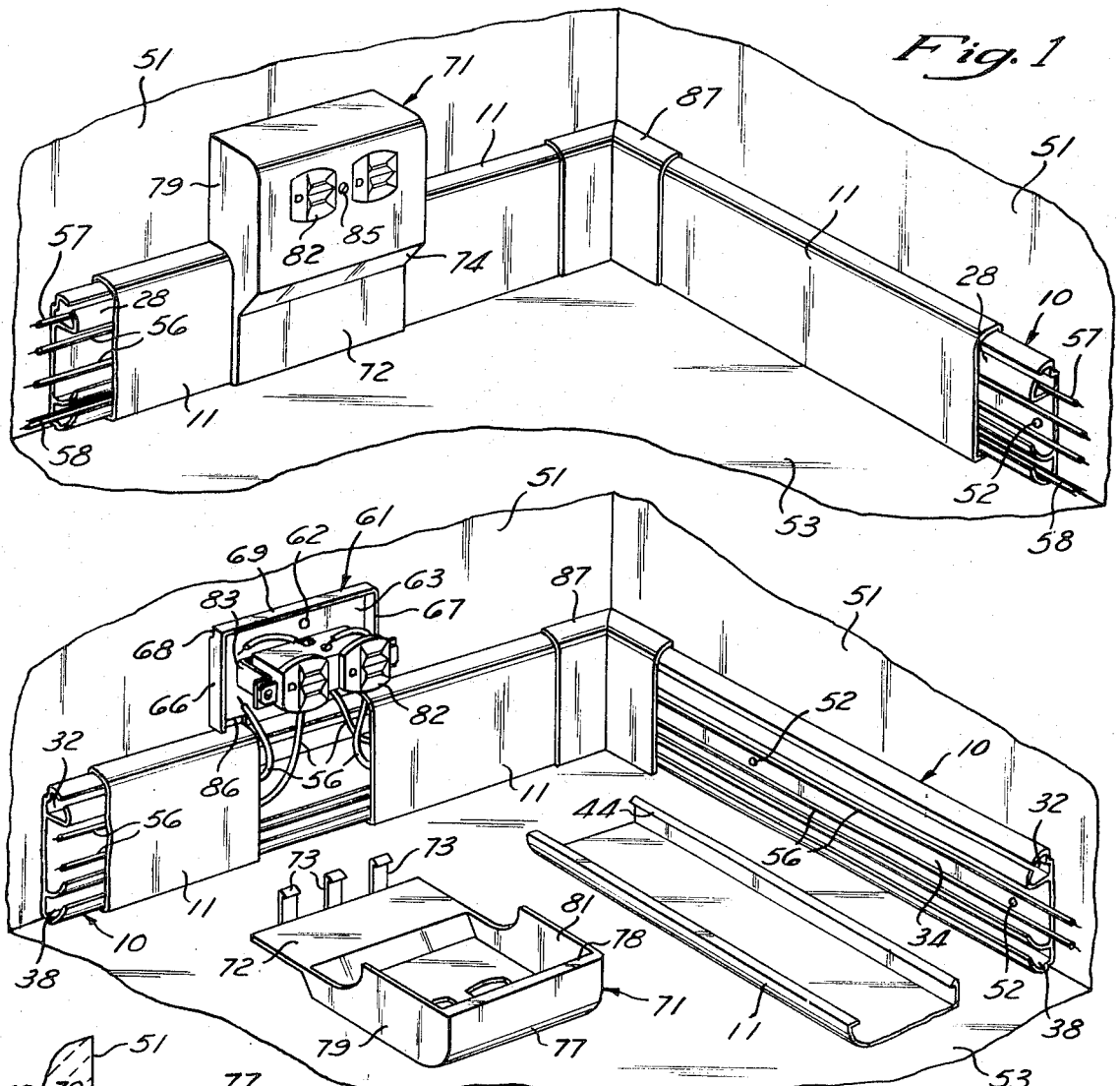
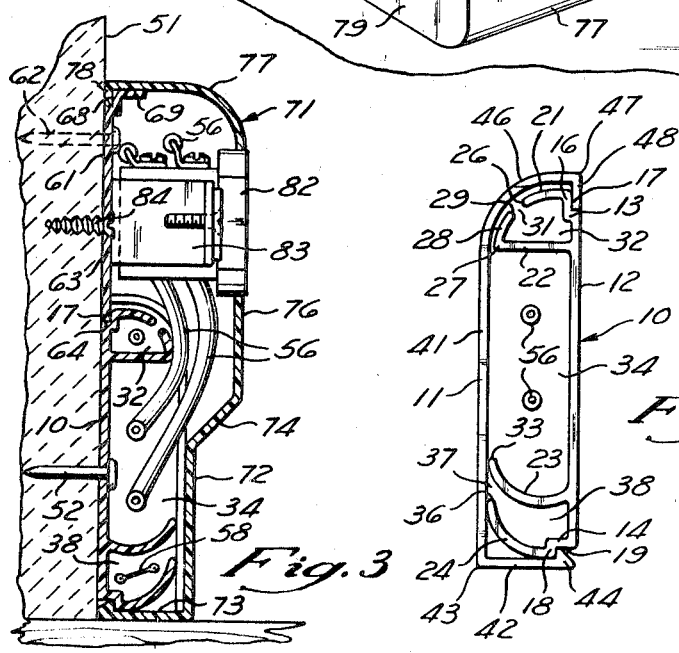
INVENTOR.
GALE A. GOODING
BY
M<sup>c</sup>NENNY, FARRINGTON,
PEARNE & GORDON
ATTORNEYS

United States Patent Office 3,721,762
Patented Mar. 20, 1973

3,721,762
ELECTRICAL RACEWAY AND DECORATIVE MOLDING
Gale A. Gooding, Middlefield, Ohio, assignor to Johnson Plastic Corporation, Auburn Township, Ohio
Filed Dec. 8, 1971, Ser. No. 205,870
Int. Cl. H02g 3/04
U.S. Cl. 174—48
10 Claims

ABSTRACT OF THE DISCLOSURE

An electrical raceway and decorative molding combination is disclosed which includes a retainer clip which is adapted to be secured to a wall and a removable cover member. The retaining clip and cover member are formed with extrusions shaped to provide a plurality of separate wire receiving channels along the raceway so that different types of wiring can be contained. An outlet structure is provided with an outlet receptacle adjacent to the raceway and a removable cover fits over the outlet receptacle and adjacent portions of the raceway.

BACKGROUND OF THE INVENTION

This invention relates generally to electrical wiring systems and more particularly to a novel and improved electrical raceway and decorative molding combination suitable for use in substantially all types of buildings.

PRIOR ART

In my prior Pat. No. 3,262,083, assigned to the assignee of the present invention, I disclose a raceway structure which combines an extruded retaining clip adapted to be mounted on the wall surface of a building with a removable extruded cover member. The cover member, when mounted in place, encloses the retainer clip and provides a decorative molding which may be used as a baseboard, chair rail or the like. The retainer clip cooperates with the cover member to define an electrical raceway along which wire extends to outlets secured in the retainer clip and projecting through the face of the cover member.

Such a raceway structure is particularly useful in instances in which access is desired to permit the modification of the wiring system.

SUMMARY OF THE INVENTION

The present invention is similar in certain respects to the structure disclosed in my prior patent in that it provides a structure in which access is provided for the modification of the wiring system. In the illustrated embodiment of this invention, the raceway is provided with separate channels along which different types of wiring extend. For example in the illustrated embodiment, the raceway provides three separate channels. The central channel is provided to receive the main power wiring for the building to supply power to outlets spaced along the raceway. The second channel is provided to receive other wiring such as telephone lines, hi-fi lines, antenna lines or the like. Similarly, the third channel provided is for similar or other types of wiring systems. With such a structure in which the various types of wiring are separated by the raceway structure, there is no danger of a short occurring and power voltage cannot be applied to the light gauge wire utilized in telephone, hi-fi or antenna systems or the like.

In accordance with another aspect of this invention, an outlet structure is illustrated in combination with the raceway in which the outlet is mounted on the wall adjacent to the raceway and a face member is provided to enclose the wire in the section in which it extends from the power wire channel around one of the other channels to the outlet. With such a structure, the outlet is raised away from the floor when the raceway is used as a baseboard to improve the access to the outlet. Further, the channel around which the power wire extends is substantially totally enclosed by the retainer clip to eliminate the danger of shorting or the like in the vicinity of the outlet.

These and other aspects of this invention are more fully described in the following specification.

BRIEF DESCRIPTION OF THE DRAWINGS

FIG. 1 is a fragmentary perspective view illustrating a preferred raceway in accordance with this invention extending along a wall surface at a corner of a room or the like with the cover broken away to illustrate the structure of the retaining clip;
FIG. 2 is a view similar to FIG. 1 with one cover removed along the face member of the outlet;
FIG. 3 is a cross section taken through an outlet and;
FIG. 4 is an end view of the raceway.

In the illustrated embodiment, the raceway consists primarily of a retainer clip 10 and a cover member 11 both of which are preferably formed as extrusions of plastic material. One suitable plastic material is rigid vinyl plastic since it is scratch and impact resistant and provides a degree of flexibility which is required as discussed in detail below.

Referring to FIGS. 1, 2, and 4, the retainer clip 10 is formed with a generally planar or flat rearward wall 12 extending at one end to a lateral wall 13 and at the other end to a lateral wall 14. A wall portion 16 extends from the forward end of the lateral wall 13 in a direction parallel to the rearward wall 12 so that the two wall portions 13 and 16 cooperate to form a ledge 17 which is spaced forward from the rearward wall 12 by a distance substantially equal to the wall thickness of the two members. Similarly, a wall portion 18 extends from the forward edge of the lateral wall 14 in a direction substantially parallel to the rearward wall 12 and cooperates with the lateral wall 14 to define a second ledge 19 extending lengthwise of the retainer clip and facing in a direction opposite to the ledge 17. In the illustrated structure, the ledge 19 has a greater lateral width than the ledge 17.

The retainer clip is formed with four lateral wall sections 21, 22, 23, and 24. The wall section 21 extends forwardly and downwardly from the upper edge of the wall portion 16 and terminates at an edge 26. The wall section 22 extends forwardly from the rearward wall 12 to a bend 27 and then along a curved section 28 to a longitudinally extending edge 29 which is spaced from the edge 26 of the wall section 21 to provide an entrance opening 31. The two wall sections 21 and 22 cooperate to define a first channel 32 which is totally enclosed excepting for the entrance opening 31.

The wall section 23 extends forwardly from the rearward wall 12 and is curved upward to an edge 33. This wall section 23 cooperates with the wall section 22 to define a second channel 34 having a relatively wide opening located between the edge 33 and the bend 27. The upward curve of the wall section 23 provides an upwardly opened channel wall which tends to retain conductors in position within the channel. In many instances a retainer clip (not illustrated) is provided at suitable intervals to secure the wire in place. However, even in such instances the curved shape of the wall section 23 assists in retaining the wire in position until the cover member is installed.

The wall section 24 extends forwardly from the lower end of the wall portion 18 and is also curved upwardly to an edge 36 which is spaced from the wall section 23 to provide an opening 37. Here again, the two wall sections 23 and 24 cooperate to define a third channel 38 which is totally enclosed by the wall sections excepting for the opening 37.

The cover member 11 is shaped to simulate a modern-type baseboard. However, it should be understood that other configurations can be formed in the cover member to simulate different molding shapes. The illustrated cover includes a relatively flat forward wall 41 which is joined at its lower end to a lateral wall 42 at a right angle corner 43. The rearward end of the lateral wall 42 is formed with an upstanding hook portion 44 proportioned to latch into the ledge 19 to retain the lower edge of the cover member on the retaining clip as illustrated. The cover member 11 is formed with a curved lateral wall 46 at the upper end of the forward wall 41 which curves rearwardly to a corner 47 where it joins with an inwardly extending flange or wall portion 48 that fits into the ledge 17. The hook portion 44 and wall portion 48 function as opposed inwardly extending flanges which seat in the associated ledges to secure the cover member in place. However, the cover member is sufficiently resilient to permit removal of the cover member by prying one or the other of the wall portions out of the associated ledge allowing the cover member to be snapped out of the mounted position. The upwardly curved wall section 24 and the downwardly curved wall 21 cooperate to cam the hook portion 44 and wall portion 48 apart during installation of the cover member thereby making it easy to snap the cover member into its installed position.

In the illustrated embodiment, the two wall sections 23 and 24 are proportioned to engage the forward wall 41 so that the opening 37 is closed completely when the cover member is installed. The two wall sections 21 and 22 do not engage the cover member. However, the cover member functions to effectively close the opening 31 when installed, because of the position of the opening 31 at a location upwardly and rearwardly from the corner bend 27.

In practice, the retainer clip is secured to a wall 51 by suitable fasteners 52 which may be nails, screws, or other types of fasteners. When the raceway is used as a baseboard type raceway as illustrated, the retainer clip 10 is secured to the wall 51 at a point adjacent to the floor 53 but spaced therefrom the proper distance so that the lateral wall 42 of the retainer clip is properly positioned adjacent to the floor 53 when the cover member is installed.

Since the retainer clip and cover member cooperate to define three separate channels 32, 34 and 38 which are completely isolated and insulated from each other when the cover member is installed, the raceway is suitable for enclosing the three separate types of wiring. Preferably, power wiring 56 is located in the second and largest channel 34 and the two channels 32 and 38 are reserved for other types of wiring which, in many instances, is low voltage wiring. Such wiring can, for example, be a telephone cable 57 located in the upper or first channel 32 and antenna wire 58 located in the lower or third channel 38. Because the different types of wiring are completely separated from each other, there is no danger that shorting can occur between one type of wiring and another. This is particularly important since antenna wiring or telephone wiring is usually relatively light wire and would create a hazard if it were accidentally energized from the power wiring 56.

A receptacle outlet structure is provided along the raceway at any location where an outlet receptacle is desired. The structure of the receptacle mounting and enclosure is best illustrated in FIGS. 1 through 3. This structure includes a mounting clip 61 which is secured to the wall 51 above the retainer clip 10 by suitable fasteners 62 such as screws or nails. As best illustrated in FIG. 3, the mounting clip 61 is provided with a rearward wall 63 which extends to an edge 64 which seats in the upper ledge 17 of the retainer clip 10 to insure exact proper positioning of the mounting clip 61. The mounting clip is provided with lateral flange portions 66 and 67 which are spaced upwardly from the edge 64 to clear the cover member 11 and a ledge 68 formed by an offset in the same manner as the ledge 17 in the retainer clip 10. Adjacent to the ledge 68 the mounting clip 62 is provided with a forwardly extending flange 69 which is joined at its ends with the flanges 66 and 67, respectively.

A receptacle cover 71 is provided with a first forward wall portion 72 adapted to seat over and closely fit the forward wall 41 of the cover member 11 and laterally extending hooks 73 proportioned to snap into the ledge 19 in the retainer clip 10 in a manner similar to the hook 43 of the cover member 11. Above the wall portion 72, the cover 71 is formed with an inclined forwardly extending wall portion 74 and a forward face portion 76 thereabove. The face portion 76 extends upwardly to a curved lateral wall section 77 which extends back to a downwardly extending flange 78 which is proportioned to snap into the ledge 68 in the mounting clip 61 as illustrated in FIG. 3. Side walls 79 and 81 are also provided on the receptacle cover and are proportioned to fit along the wall 51 above the raceway cover members 11 and are contoured to fit the raceway cover members 11 to totally enclose the receptacle portion. A typical wall receptacle 82 is mounted on a support clip 83 which is in turn secured to the wall 51 by fasteners such as the screws 84. If desired, a screw 85 is provided to connect the cover 71 and receptacle 82.

The forward offset provided by the wall 74 provides additional depth and permits the use of a standard outlet receptacle 83 and permits the power wiring to be extended forwardly from the chamber 34 around the upper channel 32 as illustrated in FIG. 3. Because the opening 31 is spaced upwardly and rearwardly from the bend 27, the danger of accidental shorting between the power wiring 56 and the wire 57 within the channel is virtually non-existent. Further, the two wall sections 21 and 22 are proportioned so that the opening 31 is preferably of smaller width than the wire normally located in the channel 32 to insure that such wire is well confined within the channel. Because the material forming the retainer clip 10 is resilient, the wire can be pushed through the narrow opening and after it is within the channel 32, the wall sections spring back to retain the wire in position within the channel. On the other hand, the opening 37 need not be as small since the power wiring does not extend past such opening. The wall shape, however, does tend to retain wire within the third channel.

Preferably, the rearward wall 62 of the mounting clip 61 is narrowed at 86 so that the ends of the cover members 10 extend past the adjacent edges of the retainer clip and are completely covered when the receptacle cover 71 is mounted in position. The retaining clip therefore is utilized to properly space the ends of the adjacent cover members as illustrated in FIG. 2 to insure complete closure of the raceway system and, in effect, gauge the spacing to the desired amount.

In practice, the corner clips 87 are also provided to cover the ends of the raceway cover at both inside and outside corners. Preferably, corner clips are provided for any type of corner in the raceway that is desired. For example, in addition to inside and outside corners, corner clips can be provided for use where the raceway changes its direction from the horizontal to a vertical position as required around door openings or the like.

With the preferred embodiment of this invention, a simple low cost raceway system is provided in which a plurality of different types of wiring can be separately located within the raceway in an insulated relationship to prevent shorting hazards or the like. Further, the raceway permits opening and access when wire changes are to be made.

Although a preferred embodiment of this invention is illustrated, it is to be understood that various modifications and rearrangements of parts may be resorted to

What is claimed is:

1. A raceway comprising a retainer clip including a substantially flat rearward wall portion adapted to be mounted on a wall surface, said retainer being formed with first and second opposed lateral walls extending from opposite edges of said rearward wall portion each providing a ledge adjacent to said rearward wall portion and substantially parallel thereto, each ledge extending in a direction away from the ledge of the other lateral wall, a third lateral wall extending from said rearward wall portion between said first and second walls, a removable cover providing a forward wall and formed with inturned edge flanges engaging the associated ledge for securing said cover in position, said retainer clip and cover cooperating to define first and second axially extending channels separated by said third lateral wall, said second channel being adapted to receive power wire and said first channel being adapted to receive separate wiring such as telephone wire, antenna wire or the like, said third wall extending into close proximity with said forward wall, said third wall and one of said first and second walls cooperating to define said first channel and are shaped to provide a narrow opening through which said separate wire is inserted and removed, and outlet means being provided for mounting on a wall on the side of said first channel remote from said second channel, said outlet means including an outlet and a face member having a portion with a depth greater than the depth of said first channel, said portion extending from said outlet over said first channel to a position in communication with said second channel permitting power wire to extend from said second channel around said first channel and connect with said outlet.

2. A raceway as set forth in claim 1 wherein said third wall is shaped to provide insulation between the power wire and the other wiring.

3. A raceway as set forth in claim 2 wherein said outlet means includes a mounting clip providing a third ledge opposing the remote one of said ledges when said mounting clip is mounted adjacent to said retainer clip, and said face member provides inturned flanges adapted to engage said third ledge and remote ledge to secure it in position.

4. A raceway as set forth in claim 3 wherein said mounting clip includes an edge adapted to fit against the adjacent ledge to properly position said mounting clip with respect to said retainer clip.

5. A raceway as set forth in claim 4 wherein said cover includes two separate cover members, said edge of said mounting clip insures a proper minimum spacing between said cover members, said face member being proportioned to cover the space between said cover members.

6. A raceway as set forth in claim 5 wherein said retainer clip includes a fourth lateral wall extending into close proximity with said forward wall, said retainer clip and said cover member cooperating to define a third channel on the side of said second channel remote from said first channel.

7. A raceway comprising a retainer clip mounted on a wall, a cover removably mounted on said retainer clip, said retainer clip and cover cooperating to define first and second channels, power wire in said second channel, separate wiring such as telephone wire, antenna wire or the like in said first channel, outlet means including an outlet mounted on the side of said first channel remote from said second channel, said power wire extending around said first channel and connecting with said outlet, said outlet means including a face member removably mounted on said raceway enclosing said outlet and the power wire as it extends around said first channel, said retainer clip providing wall means separating said other wire from said power wire.

8. A raceway as set forth in claim 7 wherein said retainer clip and cover cooperate to define a separate third channel on the side of said second channel remote from said first channel, and third wiring is positioned in said third channel.

9. A raceway as set forth in claim 8 wherein said retainer clip provides substantially complete enclosure of said first channel with limited access provided thereto when said cover is removed.

10. A raceway as set forth in claim 9 wherein said cover includes two cover members spaced from each other at said outlet means, and said face member cooperates with said retainer clip to close said third channel between said cover members.

References Cited

FOREIGN PATENTS

| | | | |
|---|---|---|---|
| 401,591 | 7/1969 | Australia | 174—49 |
| 6,709,645 | 1/1968 | Netherlands | 174—48 |
| 1,141,643 | 1/1969 | Great Britain | 220—3.94 |
| 274,954 | 5/1965 | Australia | 174—48 |

BERNARD A. GILHEANY, Primary Examiner

D. A. TONE, Assistant Examiner

U.S. Cl. X.R.

174—97, 72 C